United States Patent [19]
Styba

[11] Patent Number: 6,016,637
[45] Date of Patent: Jan. 25, 2000

[54] DOCK SEAL AND METHOD OF PRODUCING THE SAME

[75] Inventor: Loren K. Styba, Franklin, Wis.

[73] Assignee: Kelley Company, Inc., Mequon, Wis.

[21] Appl. No.: 09/094,530

[22] Filed: Jun. 12, 1998

Related U.S. Application Data

[60] Provisional application No. 60/049,416, Jun. 12, 1997.

[51] Int. Cl.[7] .................................................. E04G 23/00
[52] U.S. Cl. ....................... 52/745.2; 52/173.2; 52/309.6; 52/745.16
[58] Field of Search ............................... 52/173.2, 309.4, 52/309.6, 745.19, 745.2, 745.15, 745.16; 428/304.4, 306.6, 308.4, 318.4, 318.6, 318.8; 427/421, 422, 424, 425, 428, 429, 430.1; 264/271.1, 273, 274, 279, 279.1

[56] References Cited

U.S. PATENT DOCUMENTS

| | | | |
|---|---|---|---|
| 3,500,599 | 3/1970 | Sciolino | 52/173.2 |
| 3,772,839 | 11/1973 | Timbers | 52/173.2 |
| 3,792,559 | 2/1974 | Frommelt et al. | 52/173.2 |
| 4,015,380 | 4/1977 | Chalfant | 52/173.2 |
| 4,711,059 | 12/1987 | Layne | 52/173.2 |
| 5,333,424 | 8/1994 | Chalfant et al. | 52/173.2 |

*Primary Examiner*—Michael Safavi
*Attorney, Agent, or Firm*—Michael Best & Friedrich LLP

[57] ABSTRACT

A dock seal for sealing the interface between a vehicle and a loading dock, including a resilient member and a flexible material embedded in the resilient member. The dock seal can be made by applying a liquid material over the resilient member and curing the liquid material to form a flexible coating. The liquid material can be applied by spraying, pouring, dipping or brushing. A puncture-resistant material can be positioned adjacent the resilient member before curing the liquid material. In one embodiment, the resilient member is attached to a dock seal frame and mounted to the loading dock.

7 Claims, 1 Drawing Sheet

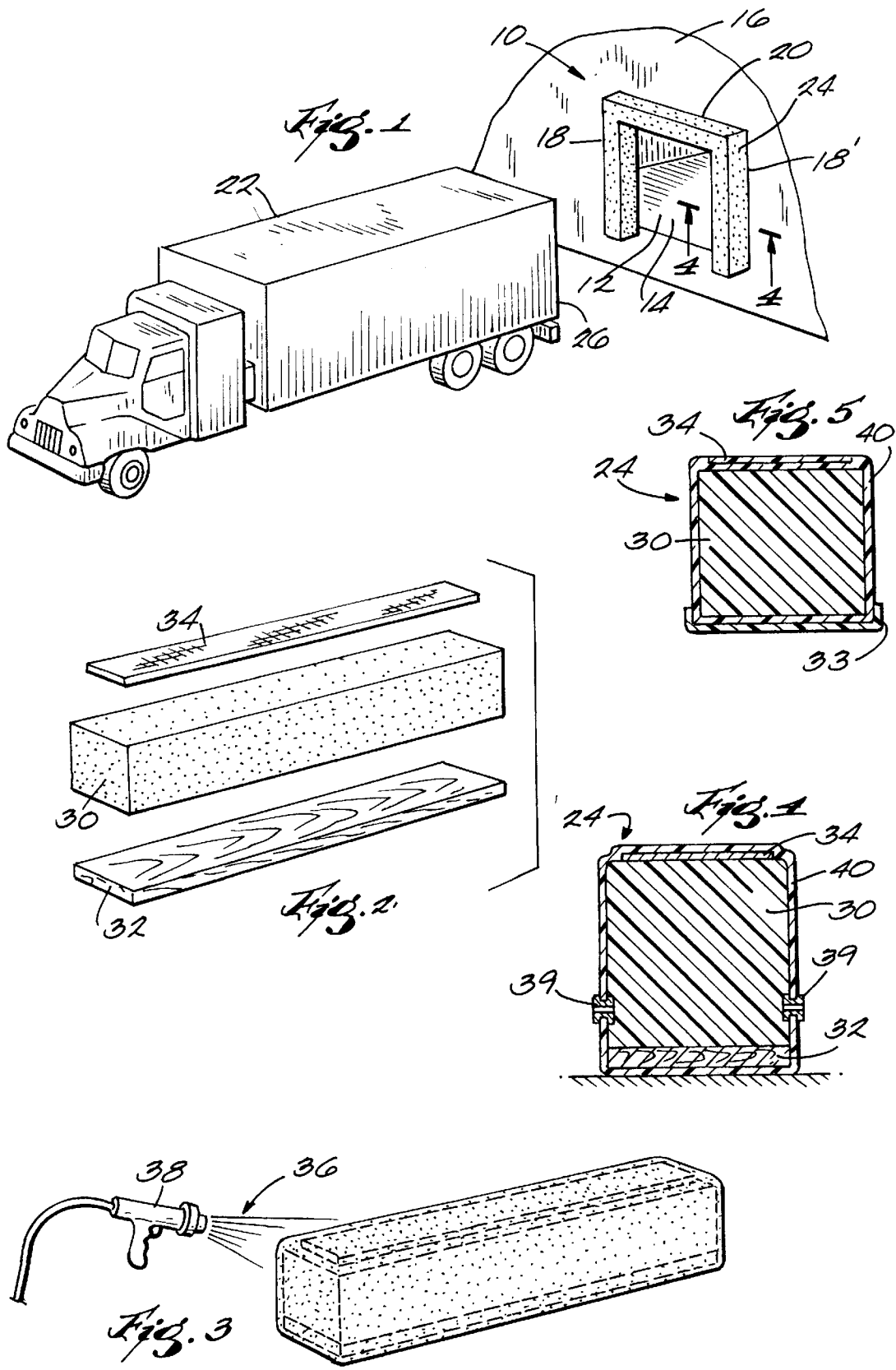

6,016,637

DOCK SEAL AND METHOD OF PRODUCING THE SAME

This application claims benefit of Provisional Application Ser. No. 60/049,416 filed Jun. 12, 1997.

FIELD OF THE INVENTION

The present invention generally relates to the field of loading docks, and more specifically to dock seals that are positioned around a loading dock opening to provide a seal between the loading dock and the open end of a vehicle (e.g., a truck or trailer).

BACKGROUND OF THE INVENTION

Most warehouses, manufacturing facilities and large retail stores include loading docks that provide a location for loading and unloading vehicles. Loading docks typically include a raised platform and a dock opening positioned above the raised platform. The dock opening is formed by a dock wall having two vertical side portions extending upwardly from the platform, and a horizontal upper portion connecting the top of the side portions. Vehicles can back toward the dock opening until the back of the vehicle is abutting the platform. The platform sometimes includes a dockleveler that provides a ramp between the platform and the bed of the vehicle to facilitate loading and unloading thereof (e.g., by a fork-lift).

Many loading docks include dock seals that provide a seal between the dock wall and the back of the vehicle. For example, such dock seals can include side pads and a head pad positioned along the side portions and upper portion, respectively. The pads are commonly made from a wear resistant fabric (e.g., urethane-coated fabric) surrounding a resilient material (e.g., foam) that is compressed when the back of the vehicle is positioned against the loading dock. The compressed pads provide a barrier against the elements (e.g., wind, rain and snow), thereby providing a comfortable working environment for the personnel working near the loading dock, and further provide a barrier against the loss of heat or cooling from inside the building. An example of a dock seal is illustrated in U.S. Pat. No. 4,679,364, which is incorporated herein by reference in its entirety.

Current procedures for manufacturing dock seals involve wrapping a fabric cover around resilient foam. This process involves cutting and sewing the fabric cover so that it fits snugly around the foam. The fabric is commonly stapled or otherwise secured to a backing member, such as plywood or sheet metal.

SUMMARY OF THE INVENTION

The above-described process for producing dock seals is very labor intensive. In addition, the labor content increases with the complexity of the shape of the seal, with some shapes not being manufacturable due to an inability to apply the covers. Errors in cutting and sewing can lead to a sloppy fit between the cover and the foam, and can also result in waste fabric, rework and delays in shipment. Accordingly, it would be beneficial if there was an alternative process for applying a cover to foam to produce a dock seal. It would be particularly beneficial if cutting and sewing operations were reduced or eliminated.

The present invention provides an improved process for producing dock seals wherein the cover is applied to the foam in a liquid form. For example, the cover can comprise a plastic-type (e.g., urethane) coating that is sprayed, dipped, brushed, or poured onto the foam. After curing or drying, the coating provides a cover that fits perfectly to the foam without the need for sewing or cutting operations, and without waste fabric being produced. Additional properties, such as puncture resistance and structural reinforcement, can be provided by adding appropriate reinforcing materials (e.g., woven and unwoven fabrics, chopped fibers, impregnates or meshes) to the coating/foam assembly. The reinforcing materials can be strategically positioned in the desired locations so that reinforcing materials are only used where needed.

BRIEF DESCRIPTION OF THE DRAWINGS

These and other features, aspects and advantages of the present invention will become better understood with regard to the following description, appended claims, and accompanying drawings where:

FIG. 1 is a perspective view of a loading dock, dock seal and vehicle.

FIG. 2 is a perspective view of the dock seal and its components prior to assembly and prior to coating.

FIG. 3 is a perspective view of the dock seal being coated by an applicator.

FIG. 4 is a cross-sectional view taken along line 4—4 of FIG. 1.

FIG. 5 is a cross-sectional view showing an alternative embodiment of the dock seal.

DETAILED DESCRIPTION

Referring to FIG. 1, a loading dock 10 is shown that provides a location for loading and unloading vehicles. The loading dock 10 includes a raised platform 12 and a dock opening 14 positioned above the raised platform 12. The dock opening 14 is formed by a dock wall 16 having two vertical side portions 18, 18' extending upwardly from the platform 12, and a horizontal upper portion 20 connecting the top of the side portions 18, 18'. A vehicle 22 is shown backing toward the dock opening.

In accordance with the present invention, the loading dock 10 further includes a coated foam dock seal 24 embodying the present invention. In FIG. 1, when the rear portion 26 of the vehicle 22 comes in contact with the dock seal 24, the dock seal 24 is compressed by the back of the vehicle 26 so as to provide a seal between the back of the vehicle 26 and the loading dock 10. The compressed dock seal 24 provides a barrier against the elements (e.g. wind, rain and snow), thereby providing a comfortable working environment for the personnel working near the loading dock 10, and further providing a barrier against the loss of heat or cooling from inside the building.

FIG. 2 illustrates several components to be included in one embodiment of the present invention. The illustrated embodiment includes, among other things, a resilient member 30 and a dock seal frame 32 adjacent to the resilient member 30. In the preferred embodiment of the present invention, the resilient member 30 comprises open cell polyurethane foam. The dock seal frame 32 preferably comprises a substantially rigid material, such as metal, wood, or rigid foam. FIG. 4 illustrates a wood frame 32, and FIG. 5 illustrates a galvanized steel frame 33. In addition, the illustrated dock seal 24 includes a puncture-resistant material 34 adjacent the resilient member 30. The puncture-resistant material 34 can be any of a number of known materials that provide puncture resistance. Typically, man made materials, such as nylon or polyester, work well. In the illustrated embodiment, the puncture-resistant material 34 comprises polyester.

FIG. 3 illustrates a method of making the dock seal. In this embodiment, a liquid material 36 is applied to the resilient member 30 by spraying with a spray gun 38. The spray process utilized for applying the coating can be performed by the Russell Products Company, Inc. of Cleveland, Ohio. In order to maximize coverage on all surfaces, the assembly can be supported on a bed of nails. Reinforcing materials can be sprayed with the coating (e.g., blown chopped fibers, such as fiberglass) or applied over or under the coating (e.g., as mat or woven fibers). In this manner, the reinforcing materials can be added only where reinforcement is required. Such reinforcing materials could alleviate the need for the puncture-resistant material 34. To allow air to escape when the dock seal 24 is compressed, vent holes 39 (FIG. 4) can be provided.

The liquid material 36 is cured to form a coating of seamless flexible material 40 over the resilient member 30. The flexible material 40 preferably comprises a cured liquid urethane, which has been found to provide good wear-resistance. Alternatively, the flexible material 40 may comprise other cured flexible coatings such as vinyl or plastic. The proper choice and positioning of reinforcing materials can further enhance the wear-resistant and puncture-resistant properties of the flexible material 40. In the embodiment illustrated in FIGS. 3 and 4, the liquid material 36 covers the dock seal frame 32 and the puncture-resistant material 34.

In the alternative embodiment of FIG. 5, the puncture-resistant material 34 can be applied after the liquid material 36 is applied to the resilient member 30. For example, the puncture-resistant material 34 can be sewn to, glued to, or embedded into the flexible material 40. Also in the alternative embodiment of FIG. 5, the dock seal frame 32 is attached to the resilient member 30 shortly after the liquid material 36 is applied. For example, the frame 32 can be applied to the resilient member 30 when the liquid material 36 is still uncured to thereby mold the puncture-resistant material 34 into the flexible material 40.

In a further step of this embodiment, the dock seal frame 32 is mounted to a loading dock 10 so as to surround three sides 18, 18', 20 of the dock opening 14 as shown in FIG. 1.

The preferred embodiment of the present invention is advantageous because it: (1) provides a seamless covering of the dock seal, (2) provides a good fit of the flexible material over the resilient member, (3) provides a dock seal that is easy to manufacture, (4) allows the use of a wide variety of shapes and geometries, (5) speeds up the manufacturing process greatly, and (6) allows for positioning of reinforcement only where needed.

In addition to the embodiment where the dock seal 24 is manufactured by spraying the liquid material 36 onto the resilient material 30, additional embodiments include brushing the liquid material onto the resilient member, dipping the resilient member into the liquid material, and pouring the liquid material over the resilient member. When the liquid material 36 is cured it becomes a flexible material 40 that is embedded into the resilient member 30.

The foregoing description of the present invention has been presented for the purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of making a dock seal and mounting the dock seal to a loading dock, said method comprising the steps of:

providing a resilient material;

applying a liquid material over the resilient material;

curing the liquid material to form a flexible coating; and mounting the resilient material with flexible coating to a loading dock.

2. The method of claim 1, wherein said applying step comprises the step of spraying the liquid material on the resilient member.

3. The method of claim 1, wherein said applying step comprises the step of brushing the liquid material on the resilient member.

4. The method of claim 1, wherein said applying step comprises the step of dipping the resilient member into the liquid material.

5. The method of claim 1, wherein said applying step comprises the step of embedding the liquid material into the resilient member.

6. The method of claim 1, further comprising the step of attaching the resilient member to a frame.

7. The method of claim 6, wherein said mounting step comprises the step of mounting the frame to a loading dock.

* * * * *